United States Patent
Jacob et al.

(10) Patent No.: US 10,592,476 B2
(45) Date of Patent: Mar. 17, 2020

(54) ENABLING CLIENTS TO EXPOSE SECURED FILES VIA VIRTUAL HOSTS

(71) Applicant: HomeAway.com, Inc., Austin, TX (US)

(72) Inventors: Bryon Kristen Jacob, Austin, TX (US); Ronald William Corbett, Austin, TX (US)

(73) Assignee: HOMEAWAY.COM, INC., Austin, TX (US)

( * ) Notice: Subject to any disclaimer, the term of this patent is extended or adjusted under 35 U.S.C. 154(b) by 304 days.

(21) Appl. No.: 14/887,323

(22) Filed: Oct. 19, 2015

(65) Prior Publication Data

US 2017/0111435 A1    Apr. 20, 2017

(51) Int. Cl.
*H04L 29/08* (2006.01)
*G06F 17/30* (2006.01)
*G06F 16/182* (2019.01)
*G06F 16/14* (2019.01)

(52) U.S. Cl.
CPC ............ *G06F 16/183* (2019.01); *G06F 16/14* (2019.01); *G06F 16/152* (2019.01); *H04L 67/1097* (2013.01)

(58) Field of Classification Search
CPC . H04L 67/1097; G06F 16/183; G06F 16/137; G06F 16/152; G06F 16/14
See application file for complete search history.

(56) References Cited

U.S. PATENT DOCUMENTS

| | | | |
|---|---|---|---|
| 2007/0136279 A1* | 6/2007 | Zhou | G06F 17/30887 |
| 2012/0159308 A1* | 6/2012 | Tseng | G06F 9/4443 |
| | | | 715/234 |
| 2015/0215389 A1* | 7/2015 | Spencer | H04L 67/1002 |
| | | | 707/741 |
| 2015/0227535 A1* | 8/2015 | Avati | G06F 17/30097 |
| | | | 707/741 |
| 2015/0269683 A1* | 9/2015 | Lehnert | G06Q 20/322 |
| | | | 705/30 |
| 2016/0253119 A1* | 9/2016 | Reynolds | G06F 3/0604 |
| | | | 711/170 |

* cited by examiner

*Primary Examiner* — Abdulkader M Alriyashi
(74) *Attorney, Agent, or Firm* — Knobbe, Martens, Olson & Bear, LLP

(57) ABSTRACT

Various embodiments relate generally to a system, a device and a method provide for enabling clients to expose secured files via virtual hosts. A request may be received from a user device such that the request is associated with a content item. The request may include a file path and a content identifier. A host name of the file path may be determined from the request. Data representing a physical location of the content item within a file storage system may then be determined based on a mapped bucket associated with the host name and the content identifier. The content item may be retrieved based on the data representing the physical location within the file storage system and provided to the user device responsive to the request.

19 Claims, 8 Drawing Sheets

ENABLING CLIENTS TO EXPOSE SECURED FILES VIA VIRTUAL HOSTS

FIELD

Various embodiments relate generally to electrical and electronic hardware, computer software, wired and wireless network communications, and distributed software applications for content delivery. More specifically, a system and a method provide for enabling clients to expose secured files via virtual hosts.

BACKGROUND

Conventional techniques for content delivery have evolved away from mere pen-and-paper implementations as the complexity increases have increasingly relied on technological solutions. With the advent of computing devices, streaming content electronically has enabled content providers on the Internet to deliver massive amounts of data representing content item in real-time to users, improving their products and services. However, content providers may desire to share content selectively, such that the file paths and content identifiers are hidden and secured behind a firewall.

For example, some conventional approaches may be used to share content that is stored behind a firewall. An Internet user may be required to login and be authenticated before accessing files behind a firewall, for example. This may be problematic to assign user names and manage passwords for hundreds of thousands of customers. Similarly, users may not want to sign up for yet another authentication system. As a result, conventional systems are not well-suited to enabling content stored behind a firewall to be exposed Internet users in a secure way without disrupting the user experience.

While conventional approaches are functional, the usual structures and/or functionalities for secure content delivery are not suited to the increasing technological demands required to optimally store and serve content.

Thus, what is needed is a solution for effectively stream content without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Traveling around the world has never been easier in the Internet age. People wishing to travel less expensively, with family, or luxuriously may search various websites for the best deals and/or best amenities for hotels, vacation homes, and short-term rentals. With the advent of on-demand housing software applications, owners and travelers may interact with property listings on various websites, mobile applications, and application services. For example, a homeowner may list their property on an on-demand housing software application with an availability, rental cost, description of the property, and photos with accompanying captions describing the property. Travelers may browse through the various property listings, bookmark or indicate interest in a particular listing, and submit reviews for property listings via the on-demand housing software application provided through a mobile application operating on a mobile device or a website running on a web browser accessed through the Internet.

Users may also view content provided by administrators of the on-demand housing software application through various methods, such as viewing web pages of hosted websites by the on-demand housing software application, downloading application onto mobile devices provided by the on-demand housing software application, and viewing content pushed to the applications, for example. The on-demand housing software application may further deliver content on-demand, such as photos of property listings, streamed in high-resolution and/or high-definition, for example. Content files, such as photos, video, audio, and so forth, may be stored on a secured system, but exposed to Internet users, for example.

Figure 1A:
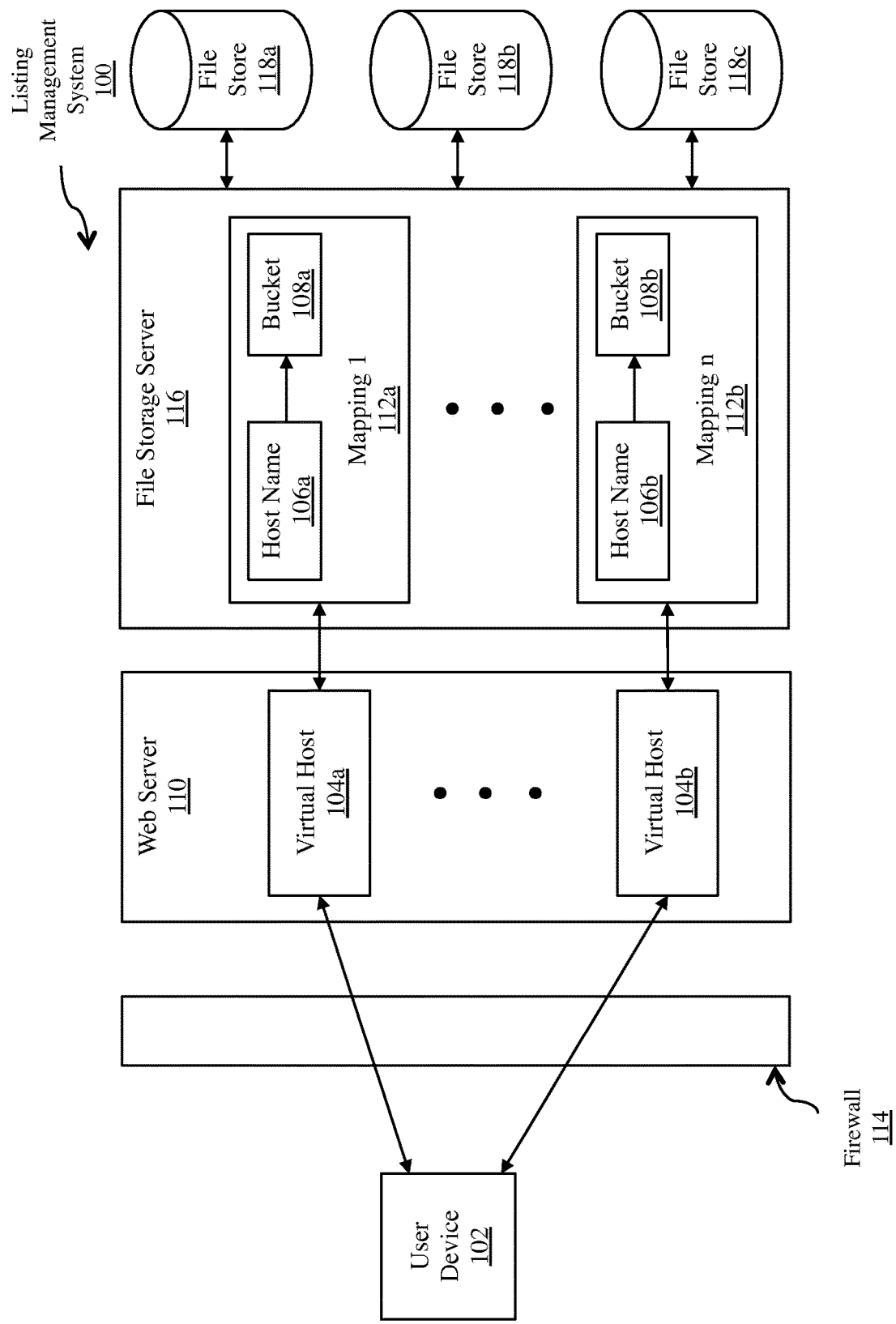
FIG. 1A is a high-level block diagram depicting a process of exposing secured files via virtual hosts in a listing management system, according to an embodiment.

FIG. 1A is a high-level block diagram depicting a listing management system 100, according to some embodiments. The listing management system 100 may receive various web requests from a user device 102 for content provided by the listing management system 100. A web server 110 may include virtual hosts 104 (e.g., virtual host 104a and virtual host 104b) to serve content to a user device 102.

FIG. 1A and the other figures use like reference numerals to identify like elements. For example, a letter after a reference numeral, such as "104a," indicates that the text refers specifically to the element having that particular reference numeral. A reference numeral in the text without a following letter, such as "104," refers to one or more of the elements in the figures bearing that reference numeral (e.g., "104" in the text refers to reference numerals "104a" and/or "104b" in the figures). While two virtual hosts 104 are illustrated in FIG. 1A to simplify and clarify the description, any number of hosts may be implemented.

As mentioned above, web requests from a user device 102 may include requests for various types of data, such as photos of a property listing, video walkthroughs of various amenities at properties, audio feedback from past visitors, and so forth. Hosting content may be challenging for administrators of the listing management system 100, and content may be stored on a file storage server 116 that may be logically addressable, but may physically reside in one or more file stores 118, for example. In another example, content may be stored in a third party web storage service, such that the file storage server 116 may reside on a third-party system outside of the listing management system 100.

Further to FIG. 1A, a web server 110 may be behind a firewall 114 such that certain files may be secured and may require authenticated users to access the files. However, other files that are stored on the file storage server 116 may be configured such that they become accessible to an instance in which user device 102, for example, through a virtual host 104. To illustrate, consider that a high-resolution photo of a company logo may be stored in a particular bucket, or a set of associated files, that may be mapped to a particular host name associated with a virtual host 104. As illustrated in FIG. 1A, a virtual host 104a is associated with a mapping ("1") 112a that stores the mapping of a host name 106a to bucket 108a. A viewing user may click on a link to view a photo having a particular file path and Uniform Resource Locator (URL) through a user device 102. The URL may point to a virtual host 104a which may be interpreted by a file storage server 116, based on mapping 1 112a, that the content file for the photo may be physically located at a particular file store 118b, for example. The content file may then be retrieved based on the mapped file location and sent to the user device 102 without the viewing user knowing that the original web request pointed to the virtual host 104a. In this way, the file may only be exposed to a user device 102 that requests the correct file path and link. This prevents content from being scraped by automated scripts ("bots") that lift information included in page source files, for example. In this way, a file storage system may include the file storage server 116 and file stores 118.

Figure 1B:
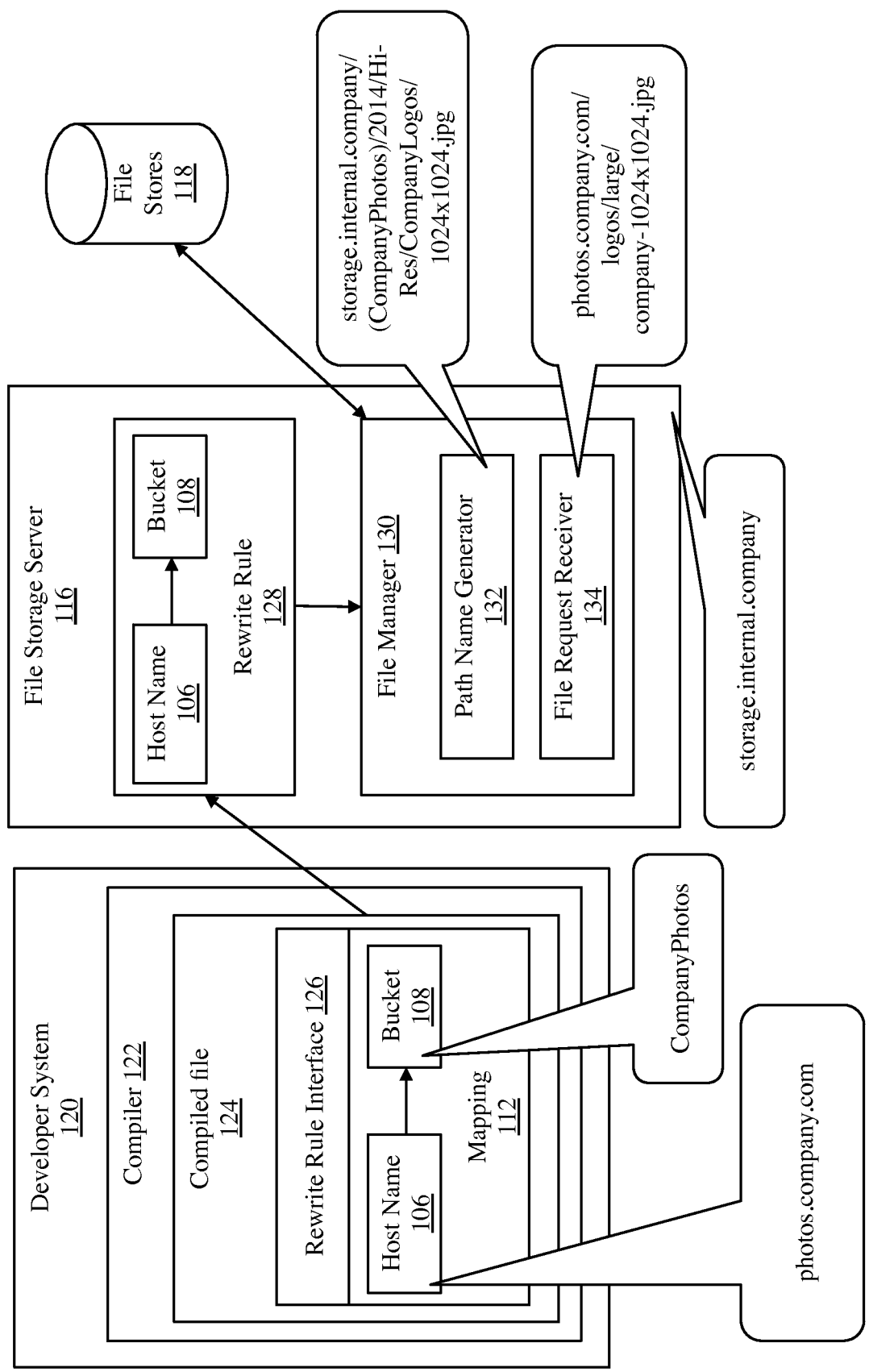
FIG. 1B is a high-level block diagram depicting a process of enabling clients to expose secured files via virtual hosts in a listing management system, according to an embodiment.

Referring now to FIG. 1B, a developer system 120 may include a compiler 122 to include computer code, or instructions, on how to rewrite a file path and/or virtually hosted file name associated with a content file stored on a file storage server 116. For example, the compiler 122 may be used to generate a compiled file 124 using a rewrite rule interface 126. The rewrite rule interface 126 may include instructions to define the mapping 112 of a host name 106 to a bucket 108. Returning to a previous example, a virtual host name 106 may be used for Internet users to access one or more content items stored on the file storage server 116. Here, the virtual host name 106 is "photo.company.com" and is mapped to a bucket 108 named "CompanyPhotos."

The developer system 120 may include one or more computers used by a developer of the listing management system 100 to enable secured content files to be exposed to Internet users via virtual hosts. A mapping 112 may associate several host names 106 to a bucket 108, in one embodiment. Other mappings 112 may associate a host name 106 to several buckets 108, in a further embodiment. The bucket 108 "CompanyPhotos" may be used as a logical address for a set of files that may be distributed among several file stores 118 accessible by a file storage server 116.

The compiled file 124 may be uploaded to the file storage server 116 such that, when a user device 102 requests a file including the host name 106 ("photos.company.com"), the compiled file 124 is expanded to execute the instructions included therein. The compiled file 124 may comprise a Java Archive (JAR) file, in one embodiment. The compiled file 124, when executed and/or expanded, may generate a rewrite rule 128 that includes instructions on how to rewrite the file path such that the content file may be retrieved from the file store 118 where it is physically located. In one embodiment, the compiled file 124 may include instructions on how to access the content file based on the file residing on a file storage service, such as AMAZON WEB SERVICES S3, for example. The rewrite rule 128 may include a URL address for the physical location(s) where the bucket 108 may be mapped, in one embodiment.

A file manager 130 may included in a file storage server 116 and may further include a path name generator 132 and a file request receiver 134. For example, a requested file path may be "photos.company.com/logos/large/company-1024×1024.jpg" as included on a web page and requested by a user device 102. Here, the file storage server 116 may be located at "storage.internal.company" and may be only accessible by clients behind the firewall 114. However, the developer system 120, through the compiled file 124, may enable a file stored at "storage.internal.company/(CompanyPhotos)/2014/Hi-Res/CompanyLogos/1024×1024.jpg" to be exposed through the requested file path "photos.company.com/logos/large/company-1024×1024.jpg." As illustrated in FIG. 1B, a path name generator 132 may execute the instructions included in the rewrite rule 128 to generate the path where the content file is located within the file storage server 116. As a result, the original path received by the listing management system 100 from the user device 102, as handled by the file request receiver 134, may be rewritten using the rewrite rule 128 for the bucket 108 by the path name generator 132, in one embodiment.

System Architecture

Figure 2:
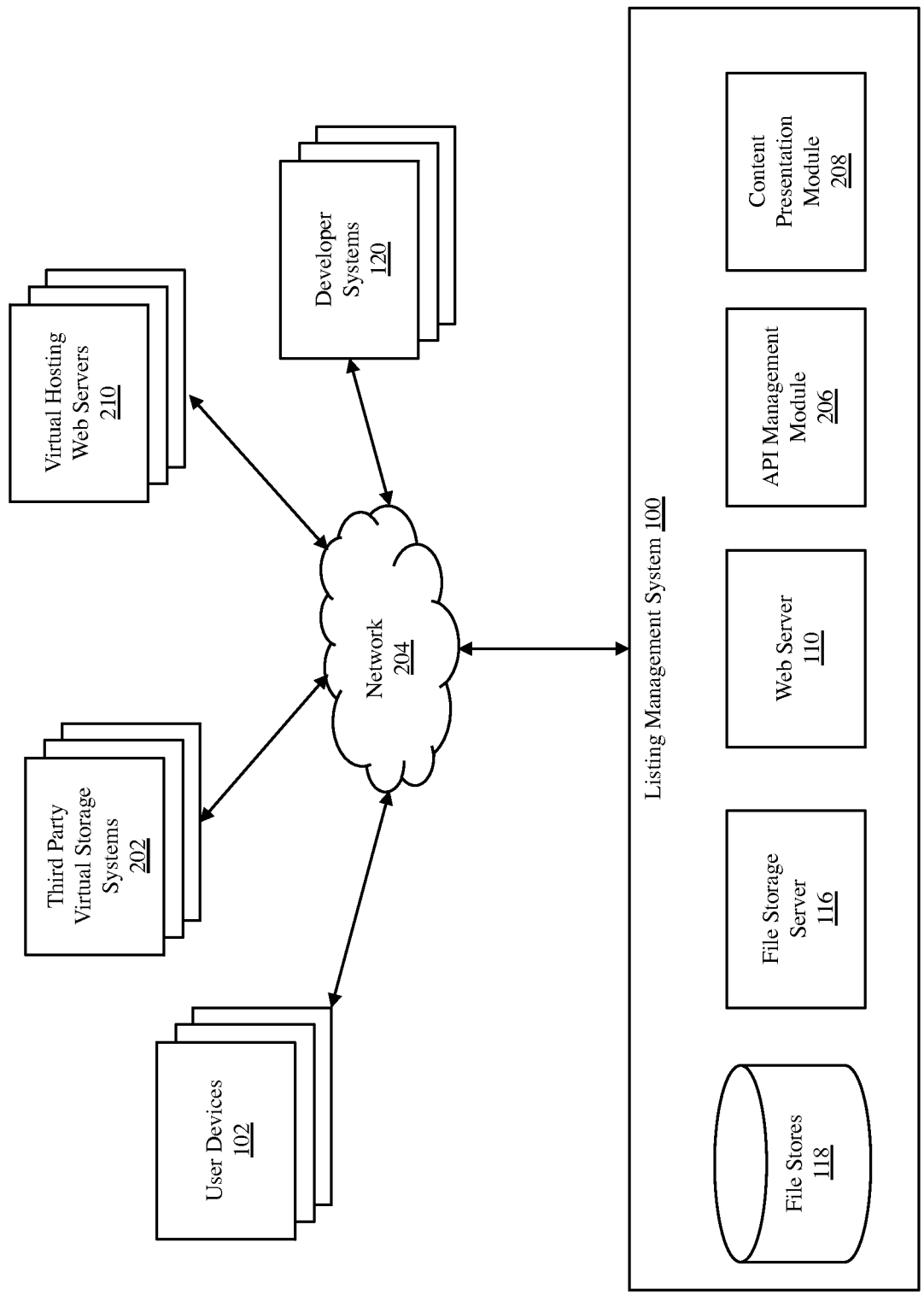
FIG. 2 is a network diagram of a system for enabling clients to expose secured files via virtual hosts in a listing management system, showing a block diagram of the listing management system, according to an embodiment.

FIG. 2 is a network diagram of a system for enabling clients to expose secured files via virtual hosts in a listing management system, showing a block diagram of the listing management system, according to an embodiment. The system environment includes one or more user devices 102, third party virtual storage systems 202, virtual hosting web servers 210, developer systems 120, the listing management system 100, and a network 204. In alternative configurations, different and/or additional modules can be included in the system.

The user devices 102 and developer systems 120 may include one or more computing devices that can receive user input and can transmit and receive data via the network 204, In one embodiment, the user device 102 or developer system 120 is a conventional computer system executing, for example, a Microsoft Windows-compatible operating system (OS), Apple OS X, and/or a Linux distribution. In another embodiment, the user device 102 or developer system 120 can be a device having computer functionality, such as a personal digital assistant (PDA), mobile telephone, smart-phone, wearable device, etc. The user device 102 or developer system 120 is configured to communicate via network 204. The user device 102 or developer system 120 can execute an application, for example, a browser application that allows a user of the user device 102 or developer system 120 to interact with the listing management system 100. In another embodiment, the user device 102 interacts with the listing management system 100 through an application programming interface (API) that runs on the native operating system of the user device 102, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the listing management 100. The listing management system 100 includes a feedback data store 106, an event data store 118, a data visualization module 120, one or more internal notification module 112, a release management module 114, a web server 210, a content store 216, a customer feedback module 208, an API management module 212, and a content presentation module 214. In other embodiments, the listing management system 100 may include additional, fewer, or different modules for various applications. Conventional components such as network interfaces, security functions, load balancers, failover servers, management and network operations consoles, and the like are not shown so as to not obscure the details of the system.

The web server 110 links the listing management system 100 via the network 204 to one or more user devices 102; the web server 110 serves web pages, as well as other web-related content, such as Java, Flash, XML, and so forth. The web server 110 may provide the functionality of receiving and routing messages between the listing management system 100 and the user devices 102, for example, instant messages, queued messages (e.g., email), text and SMS (short message service) messages, or messages sent using any other suitable messaging technique. The user can send a request to the web server 110 to upload information, for example, images or videos that are stored in file stores 118. Additionally, the web server 110 may provide API functionality to send data directly to native user device operating systems, such as iOS, ANDROID, webOS, and RIM.

File stores 118 may store content uploaded by users of the listing management system 100. Content for a property listing may include text describing the property listing, photos and/or video of the property, reviews provided by travelers staying at the property listing, amenities available at the property, contact information of the owner or property manager, and so forth. Content for a traveler may include profile information about the traveler, in one embodiment.

An API management module 206 may manage one or more adapters needed for the listing management system 100 to communicate with various third party systems, such as third party virtual storage systems 202 and virtual hosting web servers 210. Application programming interfaces (APIs), or adapters, may be used to push data to the external tools, websites, and user devices 102. Adapters may also be used to receive data from the external systems. In one embodiment, the API management module 206 manages the amount of connections to the external systems needed to operate efficiently.

A content presentation module 208 may provide content on a listing management system 100, including photos, videos, text, and graphics. The content presentation module 208 provides content for display within web browsers. Content may be displayed using various methods, such as JavaScript, Node.js, AJAX, and other methods of providing data via browsers. In one embodiment, the content delivered by the content presentation module 208 may be stored and retrieved from the file stores 118 through the file storage server 116. Similarly, the content presentation module 208 may provide content via an application natively operating on mobile devices, such as wearable devices and mobile phones. Mobile devices may require APIs to receive data from the listing management system 100. The content presentation module 208 may present data for display through these APIs. In one embodiment, the content delivered by content presentation module 208 may be stored and retrieved from file stores 118 through the file storage server 116.

The file storage server 116, in one embodiment, resides behind a company firewall 114 and exposes files via a REST API at a hostname (e.g., storage.internal.company) which is not externally visible. The file storage server 116 includes a file manager 130, as illustrated in FIG. 1 and described in further detail in FIG. 3.

Figure 3:
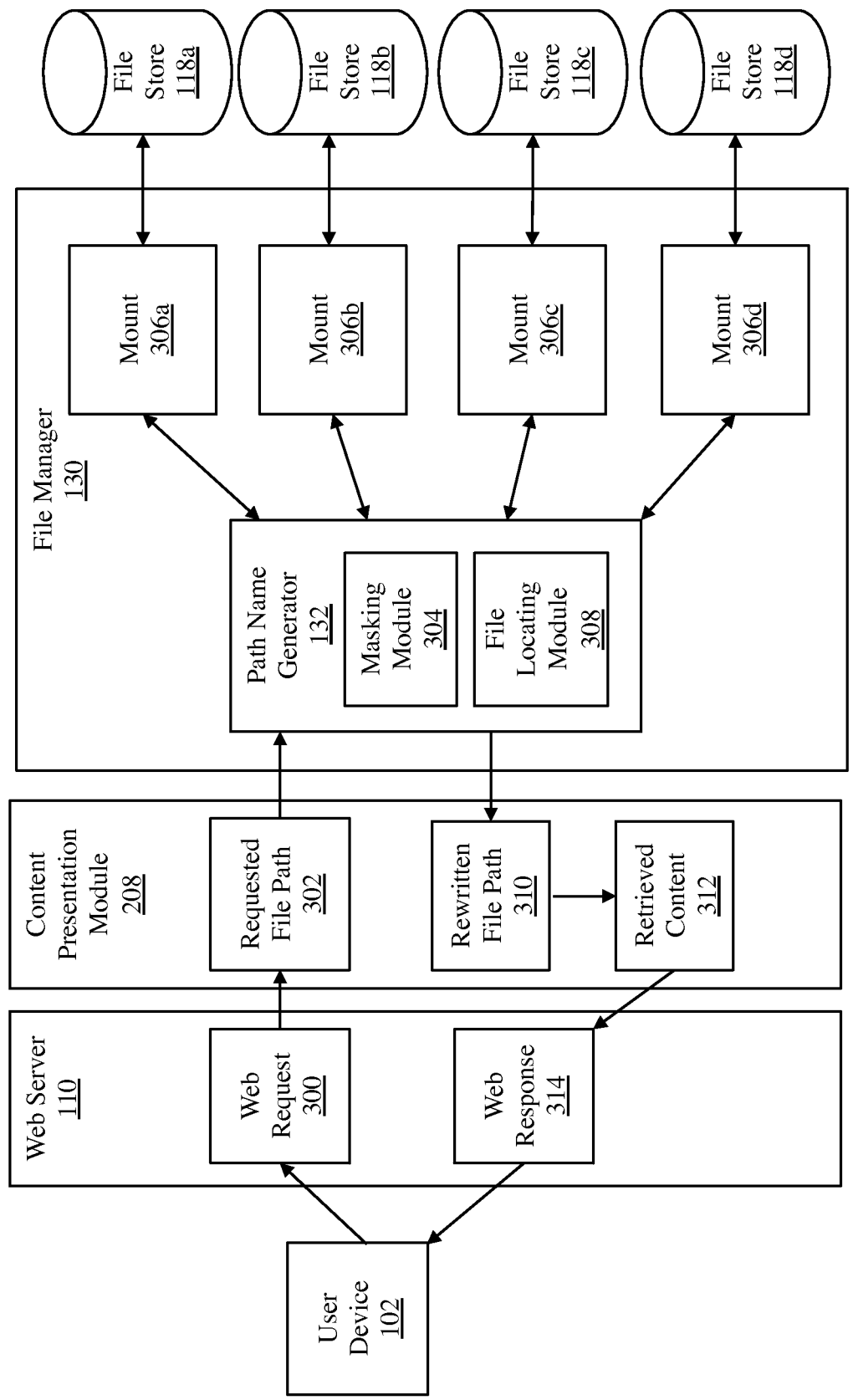
FIG. 3 is a high-level flow diagram illustrating a process for exposing secured content in a listing management system, according to an embodiment.

FIG. 3 is a high-level flow diagram illustrating a process for exposing secured content in a listing management system, according to an embodiment. FIG. 3 illustrates how a user device 102 may issue a web request 300 to a web server 110 of the listing management system 100. The web request may include a requested file path 302 of a content item stored in one of the file stores 118. The requested file path 302 may include a virtual host name, as described above. The requested file path 302 may be received via a content presentation module 208 that may provide one or more user interfaces to the user device 102 through the web server 110. Using a mapping of the virtual host name to a bucket, the path name generator 132 of the file manager 130 on the file storage server 116 may identify the bucket associated with the virtual host name.

One or more mounts 306 may be associated with a bucket. A mount (or mount point) may provide information for storing file information. A given directory path, such as (Images)/dogs/poodles for example, may be spread out over multiple mount points. The bucket "(Images)" may have content spread among different mount points. In this example, (Images)/dogs may be stored at mount 306a, labeled as a hexadecimal number such as "000001" and the directory (Images)/dogs/poodles may be stored on mount 306b, labeled as a hexadecimal number such as "000002." Mounts 306 may be in direct communication with corresponding file stores 118, as illustrated in FIG. 3.

Index data and content data may be stored under the same set of mounts 306 for a bucket. As a result, rather than doing an index look up, the physical location of a file may be deduced from its file path. A masking module 304 may be used to, in one embodiment, create a hash, such as an MD5 hash, of the file path. A file locating module 308 may perform one or more operations to locate a content item based on a requested file path 132. For example, using the last log 2(totalNumMountPoints) bits of the hash, or the mod by the number of mounts, the mount 306 that matches the supplied bits may be searched using a sharding algorithm based on the entire hash. If the file is not found, the hash algorithm may be repeated by looking at the log 2(totalNumMountPoints/2) bits of the hash. As a result, the lookup process is optimized to O(N−M+1) where N is the number of current mounts and M is the number of initial mounts, instead of O(N). In other embodiments, the masking module 304 may employ other algorithms to obfuscate a file path of where a content item is stored. Other algorithms may include various encryption algorithms and text masking algorithms to generate a representation of the internal file path. For example, a bucket name or a virtual host name may be used as a representation of the internal file path.

Once a file is located, a rewritten file path 310 may be generated by the path name generator 132 and delivered back to a content presentation module 208. Based on the rewritten file path 310, retrieved content 312 may be presented by the content presentation module 208 as part of a web response 314 to the user device 102. A web response 314 may be an HTTP response, for example. A web response 314 may be a REST API call, providing the retrieved content 312 to a native application operating on the user device 102, in another example.

Figure 4:
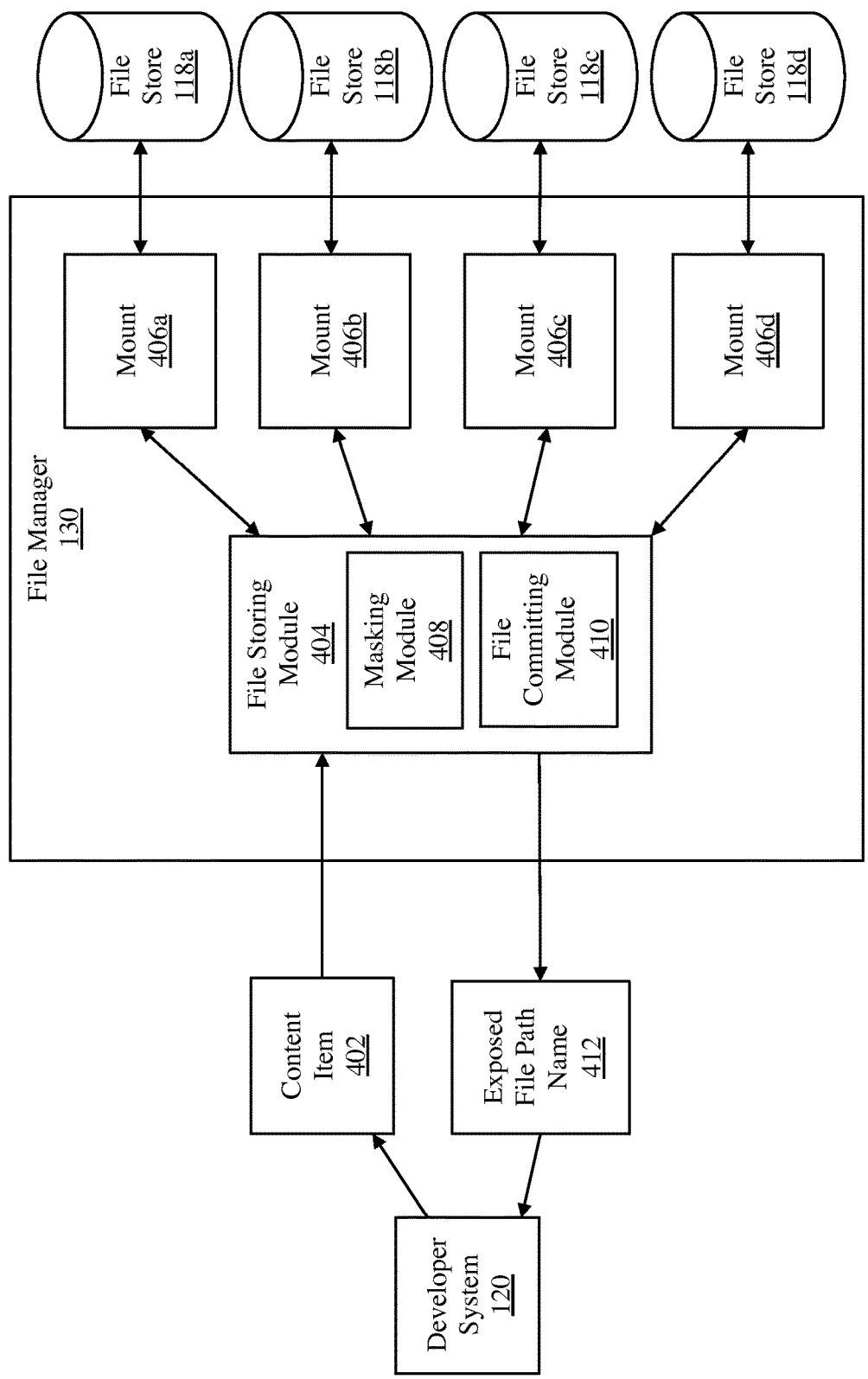
FIG. 4 is a high-level flow diagram illustrating a process for enabling a client to expose secured content in a listing management system, according to an embodiment.

FIG. 4 is a high-level flow diagram illustrating a process for enabling a client to expose secured content in a listing management system, according to an embodiment. A developer system 120, a client of the file manager 130 that is enabled to expose content files via virtual hosts, may specify a virtual host to be used to access files for a particular bucket, as described above. For example, "photos.company.com" maps to the "CompanyPhotos" bucket. This configuration information, or mapping 112 as illustrated in FIG. 1A, is stored within the file storage server 116 and/or a file storage system such as third-party virtual storage systems 202. Returning to FIG. 4, a particular content item 402 may be stored by a file storing module 404 included in a file manager 130 on the file storage server 116. Similar to the masking module 304 of FIG. 3, a masking module 408 may be used to determine an exposed file path name 412 for the particular content item 402. A file committing module 410 may store the content item 402 in a particular file store 118, such as file store 118*c*. In doing so, index information may be stored at mount 406*c*. The directory path for the content item 402 may then be mapped to a bucket, as configured by the developer system 120, to determine the exposed file path name 412 which includes the virtual host name mapped to the bucket.

Figure 5:
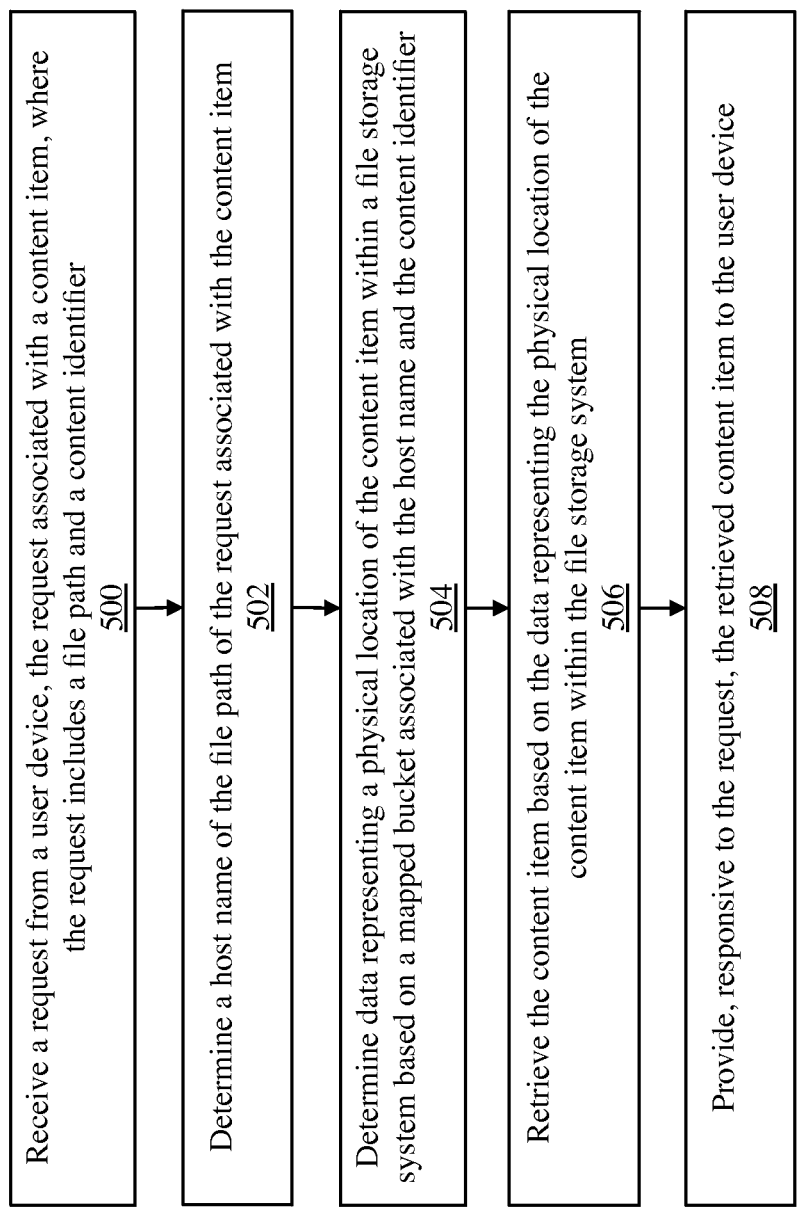
FIG. 5 is a flow chart of a process for exposing secured content via virtual hosts, according to some examples.

FIG. 5 is a flow chart of a process for exposing secured content via virtual hosts, according to some examples. A request from a user device may be received 500, where the request is associated with a content item and where the request includes a file path and a content identifier. A request may be received 500 from a user device through an application operating on the user device through an API request, in one embodiment. In another embodiment, the request may be received 500 as a web request, such as an HTTP request. An example HTTP request may be a GET request that requests data from a specified resource.

A host name of the file path of the request associated with the content item may then be determined 502. The host name of the file path may be determined 502 based on a resource name of the uniform resource locator (URL), such that the format of the file path may be recognized, in one embodiment. The host name of the file path may be determined 502 based on a text classifier matching a set of known virtual hosts being used by the listing management system 100 with the requested file path, in another embodiment.

Data representing a physical location of the content item may be determined 504 within a file storage system based on a mapped bucket associated with the host name and the content identifier. A physical location of the content item may be determined 504, for example, based on a hash of the file path to identify one or more file stores that may store the file. In another embodiment, data representing a physical location of the content item may be determined 504 based on the bucket being associated with one or more file stores in the file storage system. As described above, a file storage system may include a file storage server and several file stores where a logical bucket may be used to store content items across the several file stores. Because index and content data may be stored at mount points associated with the file stores, the data representing the physical location of the content may be determined 504 based on a hash of the file path matching the labels of the mount points. The data representing the physical location of the content item may be an internal file path that may only be accessible within the listing management system 100, in one embodiment. In another embodiment, the data representing the physical location of the content item may include a third party virtual storage system resource file path.

The content item may then be retrieved 506 based on the data representing the physical location of the content item within the file storage system. The content item may be retrieved 506 based on a lookup of the file using the content identifier against an index of a file store associated with the bucket, in one embodiment. In another embodiment, the content item may be retrieved 506 based on the file path, using a hash of the file path to identify a particular mount point that includes the index and content data.

Once the content item is retrieved 506, the retrieved content item may be provided 508, responsive to the request, to the user device. In one embodiment, the content item may be provided 508 by streaming the content as a web response in response to a web request, such as an HTTP request. In another embodiment, the content item may be provided 508 through an API response provided on a native application operating on the user device.

Figure 6:
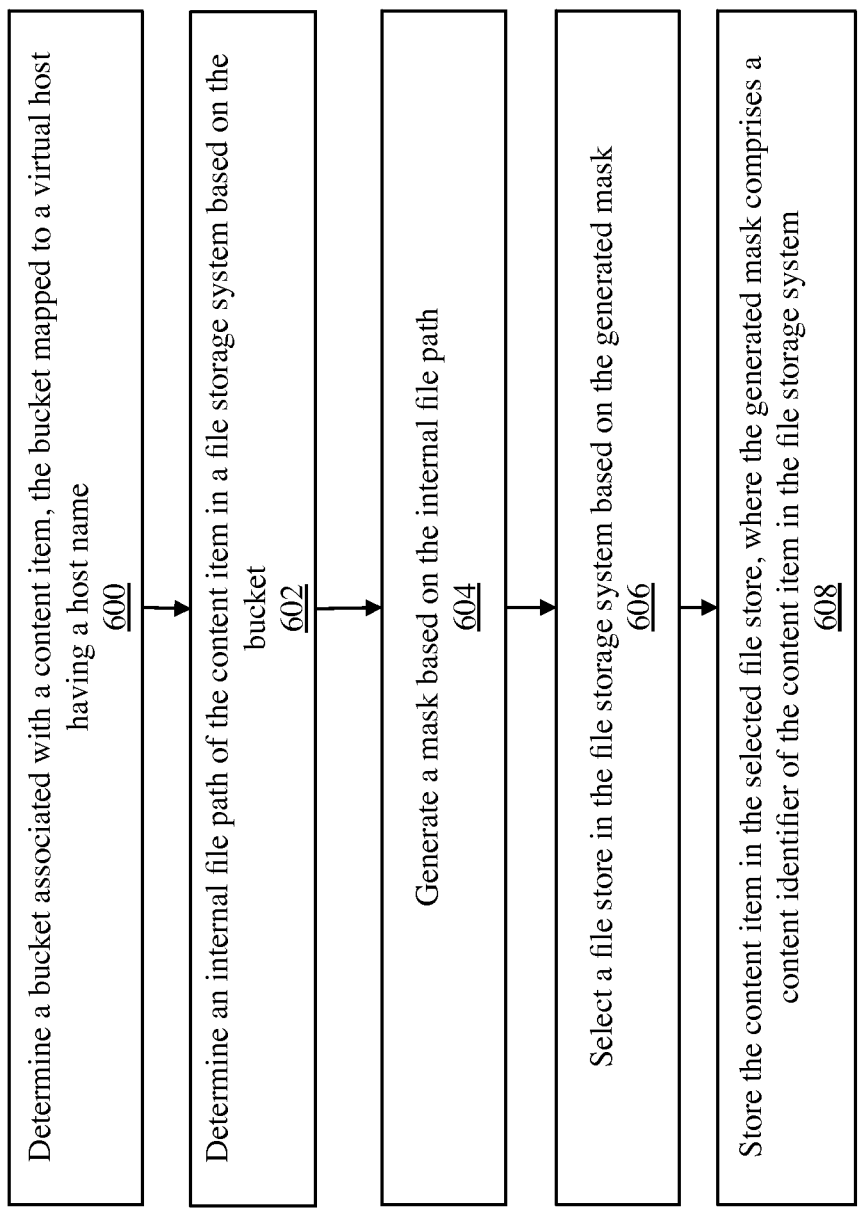
FIG. 6 is a flow chart of a process for enabling clients to store secured content that may be exposed via virtual hosts, according to some examples.

FIG. 6 is a flow chart of a process for enabling clients to store secured content that may be exposed via virtual hosts, according to some examples. A bucket may be determined 600 to be associated with a content item, where the bucket is mapped to a virtual host having a host name. For example, a content item may be a photo of a poodle, and a bucket may be determined 600 based on a developer system selecting the bucket from a list of buckets that have been mapped to virtual hosts. In an embodiment, a new bucket may be created and mapped to a new or existing virtual host. In that case, the new bucket is determined 600 to be associated with a content item based on the new bucket being created.

An internal file path of the content item in a file storage system may be determined 602 based on the bucket. For example, the internal file path may be determined 602 based on a selection of a directory and/or sub-directory of the file path by the developer system. A mask may be generated 604 based on the internal file path. For example, a mask may be generated 604 by creating a hash of the path, such as an MD5 hash. A file store in the file storage system may be selected 606 based on the generated mask. As described above, a mount point associated with a file store may be selected 606 based on the mask generated 604 based on the file path. The content item may then be stored 608 in the selected file store, where the generated mask comprises a content identifier of the content item in the file storage system.

Figure 7:
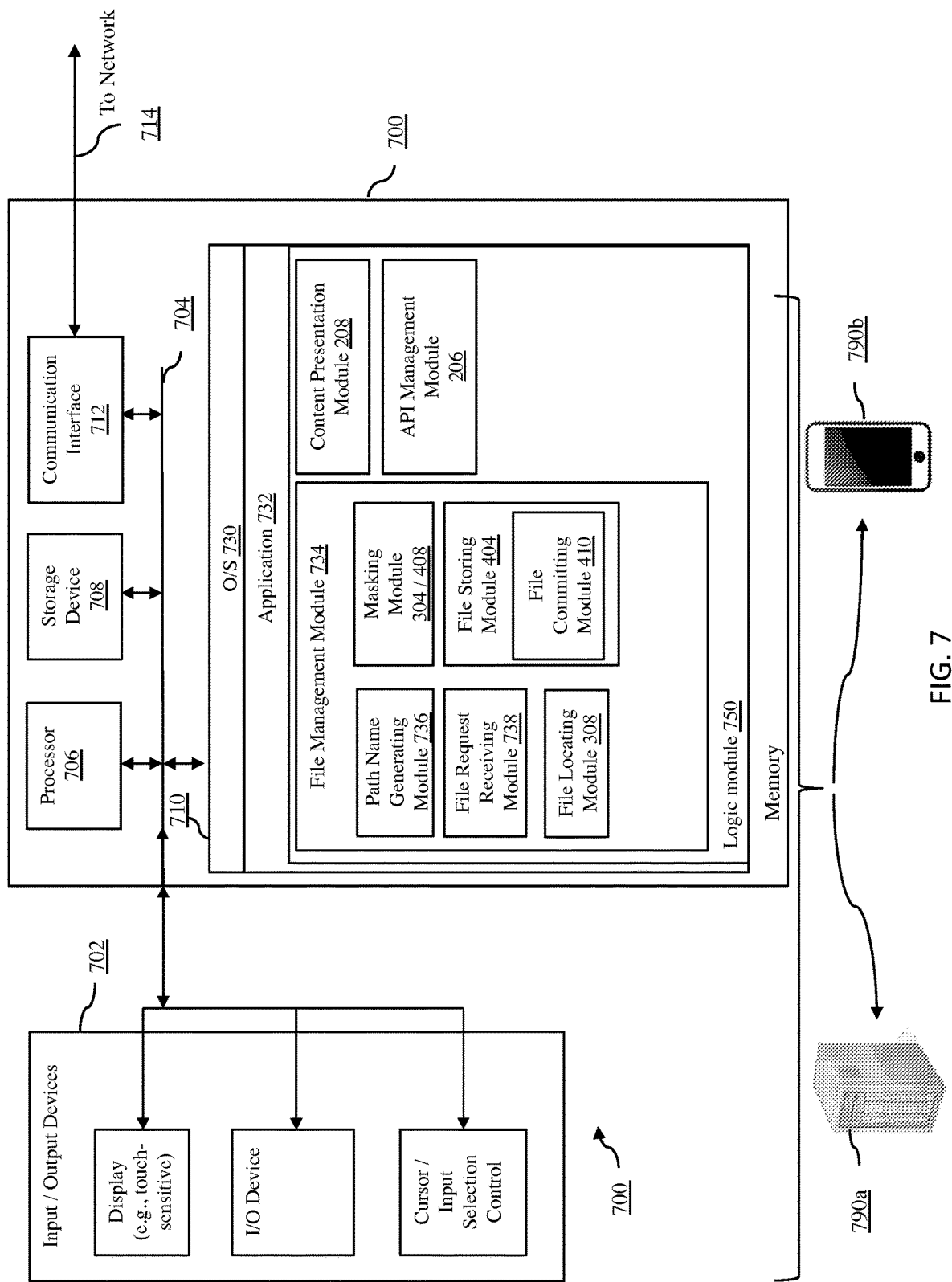
FIG. 7 illustrates an exemplary computing platform disposed in a device configured to expose secured content on implementation of a file manager in accordance with various embodiments.

FIG. 7 illustrates an exemplary computing platform disposed in a device configured to enable clients to expose secured content files in a listing management system 100 via virtual hosts in accordance with various embodiments. In some examples, computing platform 700 may be used to implement computer programs, applications, methods, processes, algorithms, or other software to perform the above-described techniques.

In some cases, computing platform can be disposed in wearable device or implement, a mobile computing device 790*b*, or any other device, such as a computing device 790*a*.

Computing platform 700 includes a bus 704 or other communication mechanism for communicating information, which interconnects subsystems and devices, such as processor 706, system memory 710 (e.g., RAM, etc.), storage device 708 (e.g., ROM, etc.), a communication interface 712 (e.g., an Ethernet or wireless controller, a Bluetooth controller, etc.) to facilitate communications via a port on communication link 714 to communicate, for example, with a computing device, including mobile computing and/or communication devices with processors. Processor 706 can be implemented with one or more central processing units ("CPUs"), such as those manufactured by Intel® Corporation, or one or more virtual processors, as well as any combination of CPUs and virtual processors. Computing platform 700 exchanges data representing inputs and outputs via input-and-output devices 702, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 700 performs specific operations by processor 706 executing one or more sequences of one or more instructions stored in system memory 710, and computing platform 700 can be implemented in a client-server arrangement, peer-to-peer arrangement, or as any mobile computing device, including smart phones and the like. Such instructions or data may be read into system memory 710 from another computer readable medium, such as storage device 708. In some examples, hard-wired circuitry may be used in place of or in combination with software instructions for implementation. Instructions may be embedded in software or firmware. The term "computer readable medium" refers to any tangible medium that participates in providing instructions to processor 706 for execution. Such a medium may take many forms, including but not limited to, non-volatile media and volatile media. Non-volatile media includes, for example, optical or magnetic disks and the like. Volatile media includes dynamic memory, such as system memory 710.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 704 for transmitting a computer data signal.

In some examples, execution of the sequences of instructions may be performed by computing platform 700. According to some examples, computing platform 700 can be coupled by communication link 714 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 700 may transmit and receive messages, data, and instructions, including program code (e.g., application code) through communication link 714 and communication interface 712. Received program code may be executed by processor 706 as it is received, and/or stored in memory 710 or other non-volatile storage for later execution.

In the example shown, system memory 710 can include various modules that include executable instructions to implement functionalities described herein. System memory 710 may include an operating system ("O/S") 730, as well as an application 732 and/or logic module 750. In the example shown, system memory 710 includes a file management module 734 including path name generating module 736, a file request receiving module 738, a file locating module 308, a masking module 304/408, and a file storing module 404 including a file committing module 410. The system memory 710 may also include a content presentation module 208 and an API management module 206. One or more of the modules included in memory 710 can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, a listing management system or one or more of its components, or any process or device described herein, can be in communication (e.g., wired or wirelessly) with a mobile device, such as a mobile phone or computing device, or can be disposed therein.

In some cases, a mobile device, or any networked computing device (not shown) in communication with an action alert controller or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a file management module 734 or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a listing management system, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in anon-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally; the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method comprising:
under control of a computing system configured to execute specific computer executable instructions,
receiving, from a user device, a request associated with a content item, the request having a file path and a content identifier;
identifying a host name from the file path;
determining data representing a location of the content item within a file storage system, wherein the data representing the location of the content item is determined based at least partly on the content identifier and a mapped storage collection associated with the host name;
generating an encoded representation of the location of the content item;
identifying a first ending subsequence of bits of the encoded representation;
identifying a first interface of a plurality of interfaces based at least partly on the first ending subsequence of bits of the encoded representation;
determining that the content item is not stored in a file storage device accessible via the first interface;
identifying a second ending subsequence of bits of the encoded representation, wherein the second ending subsequence of bits of the encoded representation is different than the first ending subsequence of bits of the encoded representation;
identifying a second interface of the plurality of interfaces based at least partly on the second ending subsequence of bits of the encoded representation;
determining that the content item is stored in a file storage device accessible via the second interface;
retrieving the content item from the file storage system using the second interface; and
providing the content item to the user device responsive to the request.

2. The computer-implemented method of claim 1, wherein receiving the request from the user device comprises receiving the request from a native application operating on the user device, wherein the request comprises an application programming interface (API) request.

3. The computer-implemented method of claim 1, wherein receiving the request from the user device comprises receiving the request from a web browser operating on the user device, wherein the request comprises an HTTP GET request.

4. The computer-implemented method of claim 1, wherein determining the data representing the location of the content item comprises retrieving a mapping associated with the host name, wherein the mapping indicates the mapped storage collection is associated with the host name.

5. The computer-implemented method of claim 4, further comprising:
determining a rewritten file path based at least partly on a rule included in the mapping, wherein the data representing the location of the content item comprises the rewritten file path.

6. The computer-implemented method of claim 1, wherein generating the encoded representation comprises determining a hash of the data representing the location of the content item.

7. The computer-implemented method of claim 1, wherein the content item is stored in the file storage system behind a firewall, and wherein the user device accesses the content item through the file path.

8. The computer-implemented method of claim 1, wherein identifying the first ending subsequence of bits of the encoded representation comprises identifying a last portion of a sequence of bits representing the encoded representation in binary form.

9. The computer-implemented method of claim 1, further comprising determining a value of a logarithmic function using a quantity of the plurality of interfaces, wherein a quantity of bits in the first ending subsequence of bits is equal to the value of the logarithmic function.

10. The computer-implemented method of claim 9, further comprising determining a value of a second logarithmic function using the quantity of the plurality of interfaces, wherein the value of the second logarithmic function is different than the value of the logarithmic function, and wherein a quantity of bits in the second ending subsequence of bits is equal to the value of the second logarithmic function.

11. The computer-implemented method of claim 1, wherein identifying the first interface based at least partly on the first ending subsequence of bits comprises determining that a label of the first interface corresponds to the first ending subsequence of bits.

12. A system comprising:
a first server comprising one or more hardware processors, wherein the first server is configured to at least:
receive a request associated with a content item, the request having a file path and a content identifier; and
identify a host name from the file path; and
a second server comprising one or more hardware processors, wherein the second server is configured to at least:
determine data representing a location of the content item within a file storage system, wherein the data representing the location of the content item is determined based at least partly on the content identifier and a mapped storage collection associated with the host name;
generate an encoded representation of the location of the content item;
identify a first ending subsequence of bits of the encoded representation;
identify a first interface of a plurality of interfaces to the file storage system based at least partly on the first ending subsequence of bits;
identify a second ending subsequence of bits of the encoded representation different than the first ending subsequence of bits;
identify a second interface of the plurality of interfaces based at least partly on the second ending subsequence of bits;
determine, based at least partly on a first search associated with the first interface and a second search associated with the second interface, that the content item is stored in a file storage device accessible via the second interface; and
retrieve the content item from the file storage device using the second interface;

wherein the first server is further configured to provide the content item to the user device.

13. The system of claim 12, wherein the encoded representation comprises a hash.

14. The system of claim 12, wherein the file storage device is accessible via fewer than all interfaces of the plurality of interfaces.

15. The system of claim 12, wherein the storage collection comprises a plurality of content items, and wherein storage of the plurality of content items is distributed among a plurality of file storage devices.

16. A non-transitory computer storage system storing executable instructions, wherein the executable instructions configure a computing system to perform a process comprising:
    receiving, from a user device, a request associated with a content item, the request having a file path and a content identifier;
    identifying a host name from the file path;
    determining data representing a location of the content item within a file storage system, wherein the data representing the location of the content item is determined based at least partly on the content identifier and a mapped storage collection associated with the host name;
    generating an encoded representation of the location of the content item;
    identifying a first ending subsequence of bits of the encoded representation;
    performing a first search of a first subset of a plurality of interfaces to the file storage system using the first ending subsequence of bits and a first algorithm;
    determining that the content item is not stored in a file storage device associated with any of the first subset of the plurality of interfaces;
    identifying a second ending subsequence of bits of the encoded representation different than the first portion ending subsequence of bits of the encoded representation;
    performing a second search of a second subset of the plurality of interfaces using the second ending subsequence of bits and a second algorithm;
    retrieving the content item from the file storage system using the second interface; and
    providing the content item to the user device responsive to the request.

17. The non-transitory computer storage system of claim 16, wherein a first file storage device of a plurality of file storage devices of the file storage system stores the content item, and wherein the first file storage device is accessible via fewer than all interfaces of the plurality of interfaces.

18. The non-transitory computer storage system of claim 16, wherein determining the data representing the location of the content item further comprises retrieving a mapping associated with the host name, wherein the mapping indicates the mapped storage collection associated with the host name.

19. The non-transitory computer storage system of claim 18, wherein the process further comprises:
    determining a rewritten file path based at least partly on a rule included in the mapping; and
    retrieving the content item based at least partly on the rewritten file path.

* * * * *

UNITED STATES PATENT AND TRADEMARK OFFICE
CERTIFICATE OF CORRECTION

PATENT NO. : 10,592,476 B2
APPLICATION NO. : 14/887323
DATED : March 17, 2020
INVENTOR(S) : Bryon Kristen Jacob Page 1 of 1

It is certified that error appears in the above-identified patent and that said Letters Patent is hereby corrected as shown below:

In the Claims

Column 16, Line 5, Claim 16, after "the first" delete "portion".

Signed and Sealed this
Ninth Day of June, 2020

Andrei Iancu
*Director of the United States Patent and Trademark Office*